United States Patent [19]

Rajala et al.

[11] Patent Number: 4,697,693
[45] Date of Patent: Oct. 6, 1987

[54] CONVEYING SYSTEMS

[75] Inventors: Gregory J. Rajala, Winnebago County; Robert J. Shavlik, Brown County, both of Wis.

[73] Assignee: Kimberly-Clark Corporation, Neenah, Wis.

[21] Appl. No.: 928,737

[22] Filed: Nov. 10, 1986

Related U.S. Application Data

[63] Continuation of Ser. No. 603,002, Apr. 23, 1984, abandoned.

[51] Int. Cl.4 .............................................. B65G 15/44
[52] U.S. Cl. ..................................... 198/699; 198/698
[58] Field of Search ............... 198/697, 698, 699, 711, 198/731, 834, 699.1

[56] References Cited

U.S. PATENT DOCUMENTS

| | | | |
|---|---|---|---|
| 501,218 | 7/1893 | Stead | 198/711 |
| 1,899,766 | 2/1933 | McWilliams | 198/711 |
| 2,743,829 | 5/1956 | Ballard | 198/834 |
| 2,875,887 | 3/1959 | Hinchcliffe | 198/699 |
| 2,930,478 | 3/1960 | Ruffino | 198/731 |
| 3,981,390 | 9/1976 | Richard | 198/698 |
| 4,494,456 | 1/1985 | Pink | 198/648 |
| 4,506,781 | 3/1985 | Briggs | 198/711 |

FOREIGN PATENT DOCUMENTS 1296569  5/1969  Fed. Rep. of Germany ...... 198/711

Primary Examiner—Joseph E. Valenza
Assistant Examiner—Lyle Kimms
Attorney, Agent, or Firm—John L. Chiatalas

[57] ABSTRACT

A conveying system useful for synchronous conveying of articles along a straight line path between a driving and driven pulley. Selected teeth of a synchronous belt are modified to provide passages between a backing and a top land. Each modified tooth is formed with a reduced addendum. A tip plate is bolted to the top land of the modified teeth so that the height of the teeth become compatible with the standard size teeth of the belt. The tip plate bolts are also used to fasten transporting devices to the backing of the belt at the locations of the nonstandard teeth.

7 Claims, 9 Drawing Figures

CONVEYING SYSTEMS

CROSS REFERENCE TO RELATED APPLICATIONS

This is a continuation of co-pending application Ser. No. 603,002 filed on Apr. 23, 1984, now abandoned.

This application is related to the following copending U.S. application: U.S. application Ser. No. 603,003 filed Apr. 23, 1984 entitled "Endless Synchronous Belt, Device for Producing Modified Teeth, Therefor" by Gregory Rajala et al, now U.S. Pat. No. 4,600,549.

BACKGROUND OF THE INVENTION

1. Field of the Invention

The present invention relates to synchronous belt systems for conveying articles, and more particularly to synchronous belt systems employing selected teeth configured to receive and house attachment fixtures for mounting to the belt a variety of conveyor transporting devices in a manner so as to not affect substantial changes to the belt's pitch line during conveying.

2. Description of Background Art

Chain and gear drive systems have been converted into conveying systems by attaching conveyor transporting devices to the chain at selected locations. Two pairs of sprocket wheels and usually a pair of continuous chains form the basic elements for a chain and gear drive system. Each chain is comprised of a plurality of equidistantly-spaced lateral rods serially linked together by pairs of linear plates swivelly affixed to the outer extremities of the rods. The spacing of the rods is such as to permit entry of a sprocket of the sprocket wheel in the region between adjacent rods promoting intermeshing of the chain with the sprocket wheels.

Such drive systems have been converted into conveying systems by attaching mounting means to either selected rods or plates enabling one to attach conveyor transporting devices at chosen locations so that articles can be brought into contact with the device on the chain and conveyed over the path of the chain during rotations of a driven intermeshing sprocket wheel.

Another conveying system has employed reinforced synchronous belts. These belts generally have a plurality of tension members or cords generally extending its length in a regimented pattern (i.e., columns of cords extending from one side edge of the belt to the other), along or near the pitch line of the belt. Integrally molded about the tension members is a resilient composition backing and a plurality of belt teeth. The backing usually has one flat surface extending the length of the belt and slightly beyond the tension members at both edges; the flat surface generally moves parallel with the path of travel of the belt. Opposite the backing, the plurality of molded teeth is disposed laterally to the longitudinally extended tension members. The molded teeth which engage the sprocket wheels of the conveying system are precisely formed and accurately spaced. The molded backing and the teeth protect the tension members from grime, oil, and moisture and from frictional wear. Thus such a belt system can be operated without the need for lubrication; and the tension members are not subject to the wear and tear exhibited by the chain of the chain drive systems.

To mount transporting devices to reinforced synchronous belts of the aforementioned type has presented problems. Transporting devices such as blocks, plates, buckets, and boxes have been adhesively fastened to the backing of such belts to convey light loads. Adhesives have been used because it has not been practical to drill holes in the belt in order to mount transporting fixtures to it.

Detachable conveyor buckets such as the one described in U.S. Pat. No. 4,248,340 of Danny L. Hild could possibly be employed on timing belt assemblies. Such a bucket is attachable and separable from a mounting bracket without the use of attachment means such as screws, bolts, and other fasteners. However, to use such a device the bracket must be affixed to the belt in a manner which would hold the bucket next to the belt at all times and particularly during translations of the belt around the circumference of the pulleys.

A major difficulty encountered by use of these prior art methods of attaching transporting devices to reinforced synchronous belts has been avoiding concentrations of stress. Since pitch lines of synchronous belts must be maintained in a neutral axis since as the belt bends around a toothed pulley, the bending pitch line is the only portion of the belt that does not change circumferential length. The belt backing material is at a larger radius from the pulley axis than the pitch line, therefore it becomes stretched as the belt bends around the pulley. As with the adhesive attachments, this stretching of the backing material puts stress on the bond joints when fixtures are adhered to the backing of the belt. An additional stress is also placed on the bond joints when the belt backing surface becomes nonplanar as the belt bends around the pulley. Consequently there are at least two parameters which limit adhering devices to the belt; namely, (1) the flexibility of the device, and (2) the longitudinal dimension of the device with respect to the pitch between the belt teeth.

Attachments to synchronous belts using headed screws or bolt-type fasteners have advantages over adhesive methods. One advantage is that the attachments are semi-permanent, allowing removal of the devices. Another advantage is that bolted devices are not prone to the same type stress failures associated with the adhesive methods. Also, a much larger variety of devices can be attached to the belts than could be attached using adhesives.

The general practice for making attachments has been to drill holes in the synchronous belt in the bottom land areas between the teeth and to use bolts routed through the drilled holes to form the belt attachments. Teeth of associated engaging pulleys are usually machined to provide clearance for the head of the fasteners. Oftimes the appropriate orientation of the belt's pitch line with respect to the pulley's pitch circle is distorted. Primary stresses associated with bolt-type fasteners are: (1) compressive stresses caused by the head of the bolt being tightened against the bottom land of the belt, and (2) contact stresses caused by the bolt's shank pressing against the wall of the mounting holes in the belt. These stresses associated with the prior bolt-type fasteners are not minimized when devices are attached in the bottom land regions of the belt.

The present invention is directed to improved techniques for forming a reinforced synchronous belt having features for attaching transporting devices which resulted from confronting and solving the basic problems as described above. In the course of the development additional unforeseen problems were resolved as will be apparent.

BRIEF SUMMARY OF THE INVENTION

The present invention is concerned with an endless synchronous belt conveyor system. A reinforced synchronous belt is formed having a plurality of both standard height teeth and nonstandard height teeth. The nonstandard teeth include at least one aperture extending perpendicularly from a backing of the belt to a top land for permitting connecting transporting devices to the belt. An attachment assembly which includes a tip plate having at least one mounting hole in alignment with the aperture of the teeth; at least one nonstandard bolt having a flat head, a smooth upper cylindrical shank of a chosen diameter and a lower threaded shank, the lower shank having a standard bolt thread permitting the use of standard threaded locknuts. The transporting device having a base with at least one hole in alignment with the aperture of the nonstandard teeth is attached to the synchronous belt by using the tip plate and the attachment assembly. As the locknuts are tightened, the base of the transporting device is compressed against the shoulder of the bolt formed at the interface between the threaded shank and smooth shank, the smooth shank having a diameter greater than the threaded shank. The height of the tip plate and bolt head when mounted to the top land of the nonstandard teeth provides a height substantially equivalent to the height of the standard teeth. Hence, the synchronous belt teeth are rendered compatible with the toothed pulleys during engagement.

BRIEF DESCRIPTION OF THE DRAWING

Referring to the drawing figures in which like numerals represent like parts in the several views.

DETAILED DESCRIPTION OF THE PREFERRED EMBODIMENT

Figure 1:
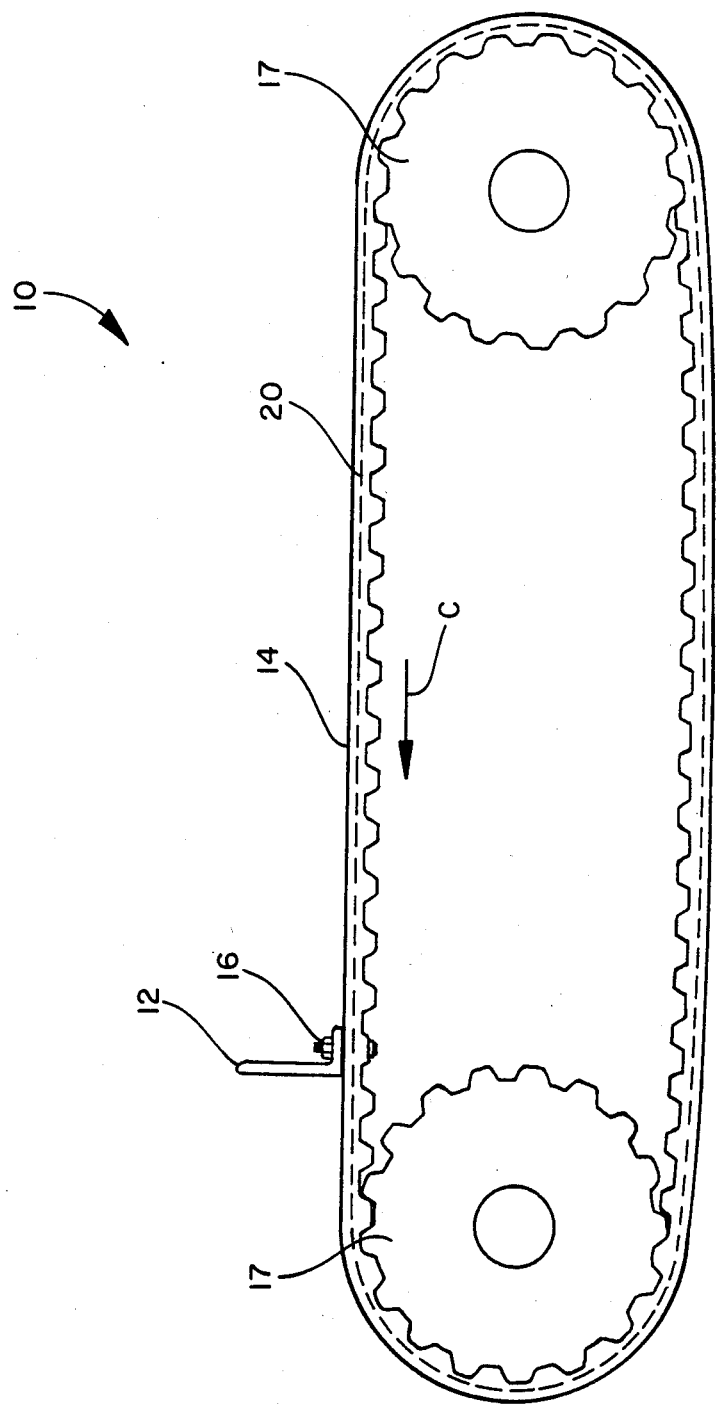
FIG. 1 is a plan view of the conveying belt of this invention in cooperative engagement with a pulley.
Figure 2:
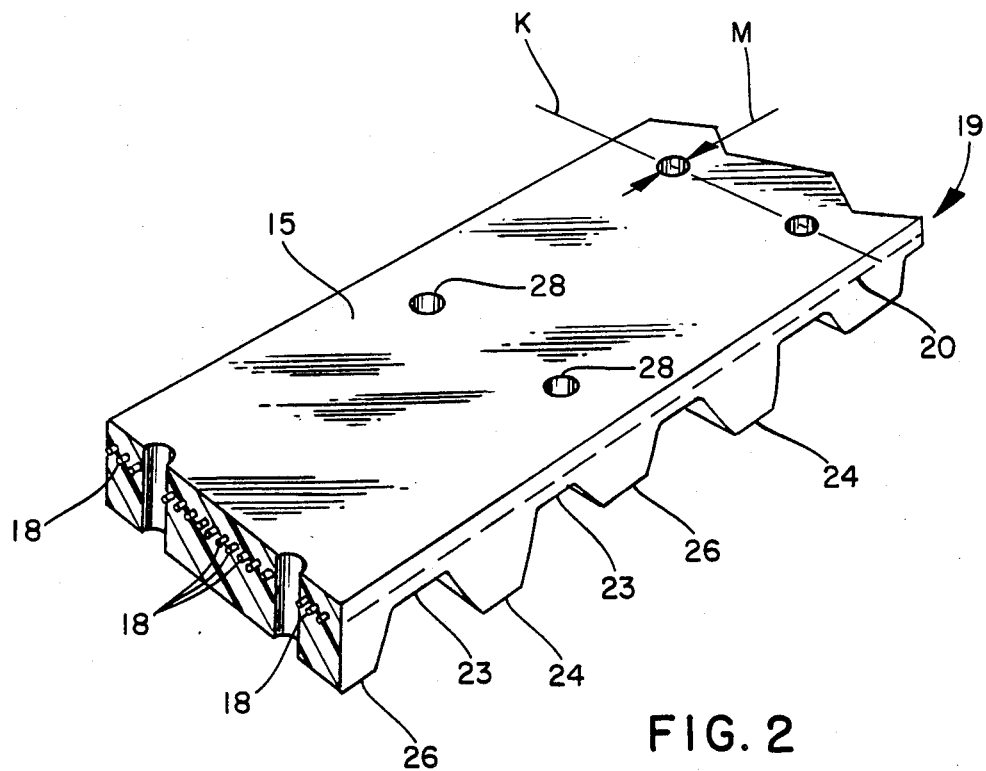
FIG. 2 is a perspective view of the inventive belt illustrative of the modifications to the timing belt which affords mounting transporting devices to it.

With reference to FIGS. 1 and 2, there is shown in FIG. 1 an unequal leg angle iron 12 serving as a transporting device attached to a pair of reinforced synchronous belts 14 at a selected location by a pair of attachment assemblies 16 forming a conveying synchronous belt system 10 in which resilient teeth of the belts intermesh with substantially rigid grooves and teeth of two sets of synchronous pulleys 17. A drive means (not shown) is attached to one set of the pulleys to drive the pulleys and belts.

Best seen in FIG. 2, the plurality of molded standard teeth 24 of a height illustratively 0.435 inch are formed precisely and spaced accurately so that the bottom lands 23 of the teeth lie near pitch line 20 of the belts so that the tooth spacing is not altered by flexing as the belt teeth pass in and out of the grooves of pulleys 17.

Intermixed with the standard teeth, a plurality of modified teeth 26 are formed at chosen locations along the belt. The modified teeth having a reduced size addendum illustratively 0.310 inch compared to the addendum 0.435 inch of the standard teeth are molded in the same manner as the standard teeth but with at least a pair of spaced holes 28 of a chosen diameter illustratively 0.313 inch formed at locations along a transverse center line K of the teeth. Teeth 24 are so modified as to provide top lands suitable for mounting portions of the attachment assembly 16 to the teeth in a manner that avoids disrupting the conjugate action between gear teeth and belt teeth and avoids causing any interference.

In the preferred embodiment, the space or pitch from center-to-center of each tooth is illustratively 1.25 inches. This is identical to the conventional belt construction for XXH or double extra heavy belts.

Illustratively, every 6th tooth is modified to accept the attachment assemblies 16. The holes 28 of 0.313 inch in diameter M are formed 1.25 inches apart and 0.375 inch from the edges of the belt, best seen in FIG. 2, to receive threaded fasteners of the attachment assembly, the width of the belts being 2 inches.

Each tension member 18 is illustratively a set of continuous helically-wound strands of 5,600 total denier plastic fiber made under the trademark KEVLAR fibers by E. I. duPont deNemours & Company Inc. of Wilmington, DE, having high tensile strength, a low degree of stretch, and excellent flexibility. In the preferred embodiment, a plurality of tension members 18 are disposed adjacently in each edge region of the belt and between the holes 28 of the modified teeth. The tension members are used to eliminate elongation of the belts.

A backing 15 for the belt and the teeth is made of a conventional polyurethane material and is molded integrally. The backing 15 and the tension members 18 form a load-carrying member 19.

Figure 3:
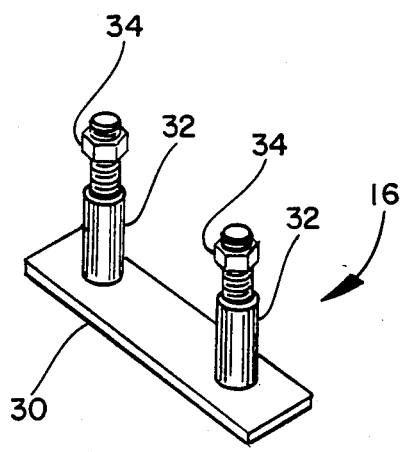
FIG. 3 is a perspective view illustrative of the attachment means used to mount transporting devices to the conveying belt of this invention.
Figure 4:
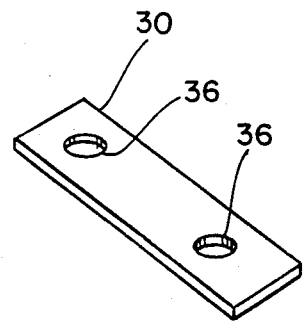
FIG. 4 is a perspective view of the face plate of the attachment means.
Figure 5:
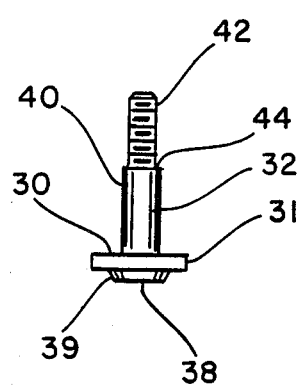
FIG. 5 is a plan view illustrative of the features of the nonstandard bolt of the attachment means.
Figure 6:
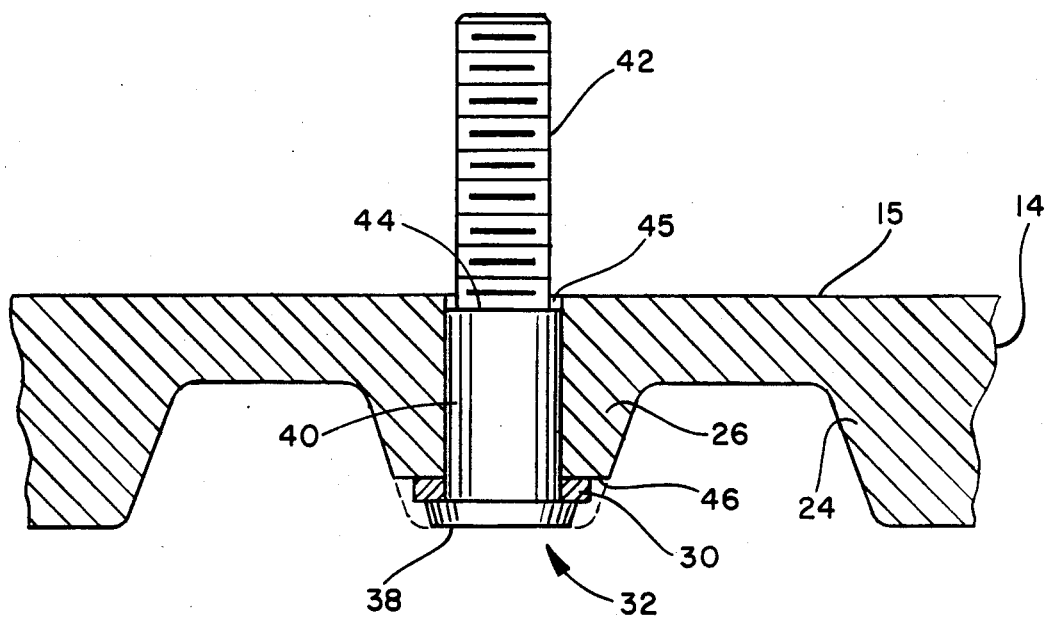
FIG. 6 is a plan view illustrating the dimensional relationship between the tip of the modified tooth and the attachment means necessary to minimize frictional contact with the grooves of a pulley.

Referring now to FIGS. 3-6, as shown in FIG. 3 each attachment assembly 16 is comprised of a metal tip plate 30, a pair of bolts 32, and a pair of conventional locknuts 34. Although plate 30 conforms to the shape of the modified tooth 26, the surface area of it is slightly less than the area of the top land of the modified teeth as best seen in FIG. 6.

Plate 30 as shown in FIG. 4 has a pair of mounting holes 36 spaced illustratively 1.25 inches apart along its longitudinal axis. Holes 36 are drilled to have a diameter of 0.313 inch. The length of the plate is illustratively 1.875 inches, the width is 0.477 inch and the height is 0.063 inch.

Bolts 32, as shown in FIG. 5, are nonstandard steel bolts each of which is comprised of a retaining head 38, a smooth upper shank 40 of nonstandard dimensions and a standard ¼-20 UNC threaded lower shank 42. The diameter of shank 42 providing a circular shoulder 44 at the interface of the shanks. The height of shank 40 is 0.507 inch while the height of lower shank 42 is 0.75 inch. The height of head 38 is 0.062 inch.

As shown in FIG. 6 although plate 30 mates with the top land 46 of the modified tooth 26, the area of plate 30 is slightly smaller than the area of surface 46. The circular area of the head 38 is suitably smaller than the area of plate 30. These structural elements have been configured in the aforementioned manner so as to eliminate contact with the working surfaces of the pulley teeth.

Note space region 45 exists about bolt 32 at the interface between the backing 15 of the belt 14 and the threaded lower shank 42 of bolt 32. Space region 45 extends a height of 0.021 inch from the circular shoulder 44 of bolt 32 to the top of the backing.

The conveyor belt in the preferred embodiment is formed using an apparatus and method disclosed in U.S. Pat. No. 3,880,558 of Breher et al. dated Apr. 29, 1975, U.S. Pat. No. 3,999,914 of Breher et al. dated Dec. 28, 1976, and U.S. Pat. No. 3,988,940 of Szonn et al. dated Nov. 2, 1976 but with some modifications. Breher et al. patents teach methods of and devices for producing reinforced profile belts of extrudable material in a continuous manner. With their devices successive portions of an endless band are passed over different sections of a molding gear of constant magnitude. Their constant magnitude gear has peripheral teeth of a constant height.

When the band engages the molding gear, a closed arc-shaped mold chamber is formed which seals off a portion of the periphery of the gear. Reinforced strength members and extruded material from which the conveyor belt is formed are continuously fed into the mold chamber along a path substantially consistent with the pitch line of the belt.

Szonn et al. patent teaches a method for interfitting ends of an endless tooth transmission belt. However, steps must be taken to make sure the holes of the belt are bypassed during such interfitting.

The modification to Breher et al.'s apparatus concerns modifying Breher et al.'s molding gear. The modification allows for changing the height of a standard tooth so as to accommodate mounting the attachment assembly to transporting devices and to individual teeth of the timing belt. Also this modification allows locating mounting holes in the modified teeth just about at any vertical position extending through the top land of the tooth. A preferred molding gear for modifying timing belts formed by Breher et al.'s apparatus is disclosed in the above-identified pending U.S. patent application Ser. No. 603,003 of Gregory Rajala et al.

Figure 7:
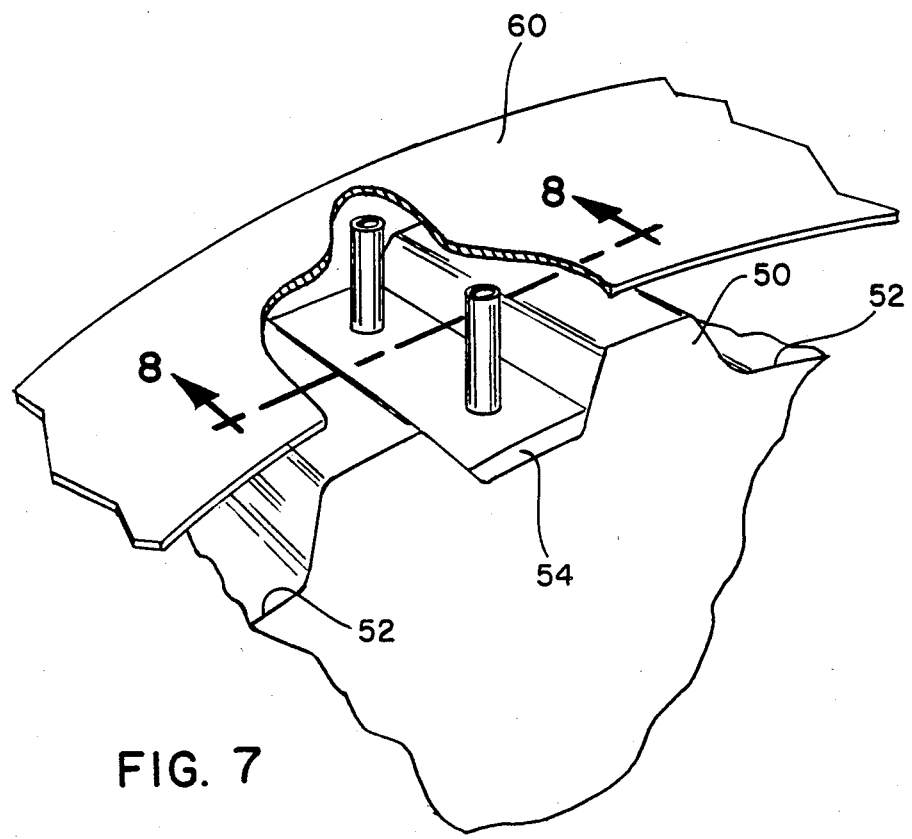
FIG. 7 is a perspective view of a device for modifying a groove of a molding gear used to produce the inventive belt system.
Figure 8:
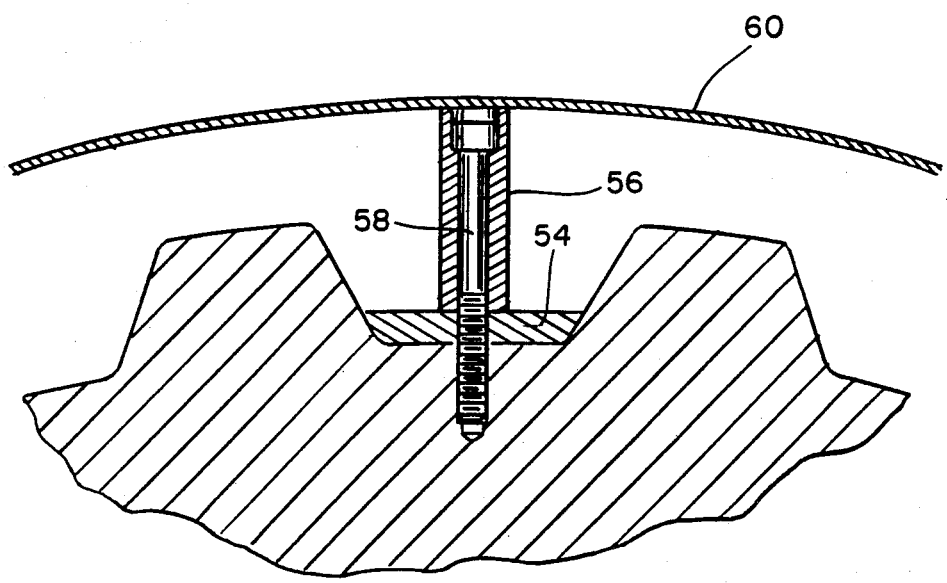
FIG. 8 is a plan view illustrative of the manner of mounting the groove modifying device.

FIG. 7 is a perspective view illustrative of the modification to the molding gear which permits changing the height of the standard teeth of the timing belt and for inserting holes in the teeth that allow mounting transporting device to the teeth. Molding gear 50 having a plurality of grooves or bottom lands 52 is a standard XXH drum mold for forming standard XXH timing belts using Breher et al. apparatus. To reduce the height of individual teeth of the molding gear 50, a groove plate 54 shaped to conform to the surface of the groove is inserted in the groove to be modified. As best seen in FIG. 8, in the preferred embodiment a pair of sleeves 56 is mounted on plate 54 by a pair of retaining screws 58. A single sleeve and screw could be used if the particular application of the belt requires using just one sleeve. Sleeves 56 can be a variety of diameters to permit forming holes in the modified tooth to accommodate a variety of sizes of mounting hardware. The height of the sleeves on retaining screws are such as to interface with an endless band 60 of the Breher et al. apparatus that is used to form the closed arc-shaped mold chamber where the reinforced strength members and extruded materials are fed.

Figure 9:
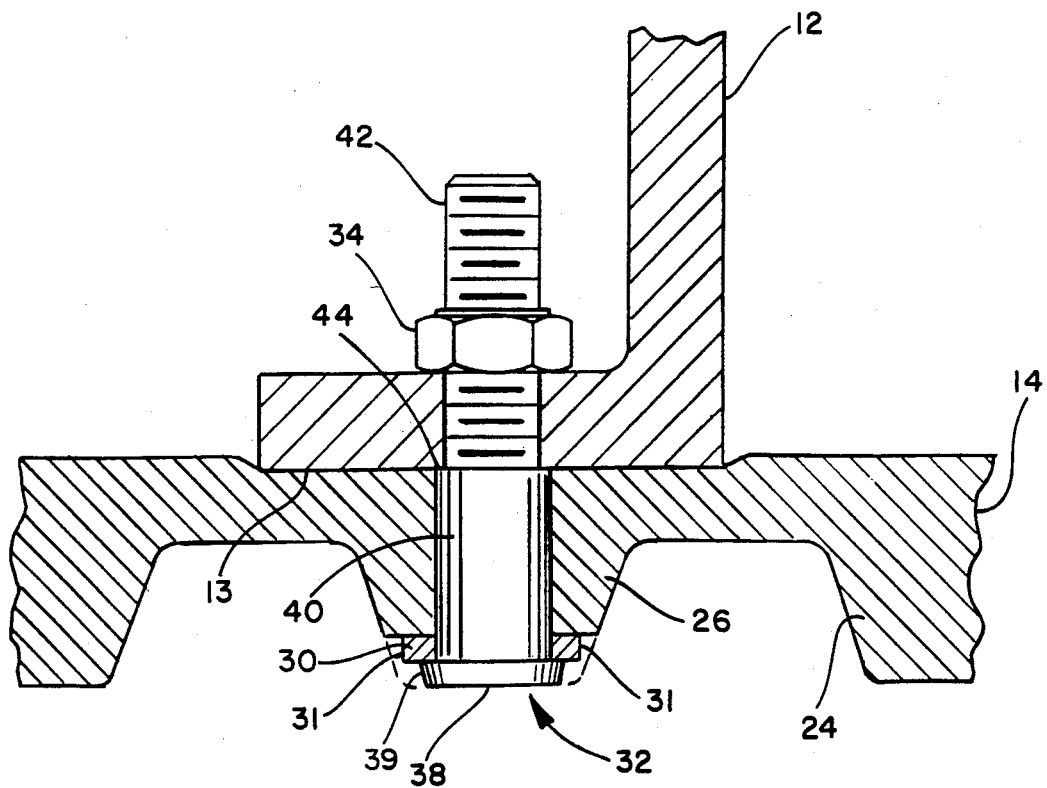
FIG. 9 is a plan view of a conveying belt with an uneven leg angle iron attached to the belt.

After forming the belt utilizing the aforementioned apparatus and modification thereto, a transporting device can be mounted to the modified tooth. Reference is now made to FIG. 9. There a plan view of illustratively an unequal leg angle iron attached to a modified tooth 26 of the conveying belt using the assemblies illustrated in FIGS. 3 through 5 is shown. It should be noted that the height of the cylindrical retaining head 38 of bolt 32 and the plate 30 combined with the height of the modified tooth 26 is compatible with the height of a standard tooth (shown in phantom). The edges 31 of plate 30 and the edge 39 of retaining head 38 are of such a shape as to be in conformance with the shape of the tip of a standard tooth as well as the selected pressure angle of a standard tooth. To ensure the retaining head 38 of bolt 32 does not rotate or move when locknuts 34 are tightened, a layer of silver solder (not shown) is used to solder head 38 to the surface of plate 30.

When locknuts 34 are tightened, they are torqued until the base 13 of the unequal leg angle iron 12 is being supported by the circular shoulder 44 of bolts 32. During tightening of locknut 34 space region 45 is eliminated. The resilient polyurethane material of the belt is compressed by base 13 such that it is fixedly and rigidly supported by shoulder 44 of bolt 32.

If a standard threaded fastener without shoulder is used instead of the mounting bolt 32, the degree of tightening of the bolt would be very indistinct, i.e., the backing would become unequally depressed, distorting the belt profile such that the belt teeth would not properly engage the pulley teeth. Also, having a threaded shank serrated edges of the bolts would tend to wear out the inner walls of the mounting holes, causing the inner wall material to abrade, enlarging unreasonably such holes in the modified teeth. Thus using bolt 32, the backing material can be compressed a controllable amount; by controlling the amount of compression, you substantially eliminate distorting the tooth profile, permitting repeatable tightening torques.

With reference to FIG. 1 again, the operation of the belt system will now be discussed. A modified endless synchronous belt 14 with a transporting device illustratively an unequal leg angle iron 12 attached is installed over a set of pulleys 17. The belt is then adjusted for takeup so that the belt teeth mesh securely with the pulley grooves. The space between pulleys is adjusted so that the proper belt deflections are obtained. A motor (not shown) for driving the belts in the direction of the arrow C is connected to one of the pulleys. Articles to be transported are stored on the angle iron transporting devices. The motor is activated, and the articles are transported over the path of the belt during rotation of the driven intermeshing belts and pulleys.

Since the angle iron 12 is rigidly mounted to the modified tooth, the pitch line of the belts remains substantially coincident with the pitch circle of the pulley teeth at all times during motion. Neither the belt nor the transporting device undergo any abnormal deflections, accelerations or decelerations during the rotation at reasonable speeds. Hence, no detrimental vibrations in the mechanism and/or uneven transmission of motion occurs during operation of the endless synchronous belt conveyor system. Such a synchronous belt having all teeth modified has run continuously for many hours between a set of 12 inch diameter pulleys without any uneven transmission of motion.

Other types and shapes of synchronous belts may be used to form such aforementioned conveying systems, provided the teeth are modified in a manner so as not to destroy the conjugate action or introduce interference between the belt and pulley teeth. Other type attachment assemblies can be mounted to the modified teeth belts provided the backing material of the belt can be compressed a controlled amount and the intermeshing of the belts and pulleys is not distorted. Also, the belts may be formed using other belt molding methods and apparatus that suitable mounting holes are formed in suitably modified teeth.

It is to be understood that the above-described embodiments are mainly illustrative of the principles of the invention. One skilled in the art may make changes and modifications to the embodiments without departing from the scope and the essential characteristics thereof.

What is claimed is:

1. An endless synchronous belt system comprising:
   A. at least one drive-toothed pulley having teeth of a chosen dedendum;
   B. at least one driven pulley spaced a chosen distance and in line from said drive pulley having teeth with dedendum corresponding with the dedendum of said drive pulley;
   C. at least one endless synchronous belt of a resilient composition intermeshingly coupled between said drive and driven pulleys, said belt having teeth of a particular configuration, said belt comprising: (1) a backing; (2) a plurality of tension members extending the full length of and in line with the pitch line of said belt; (3) a plurality of standard profile teeth spaced at specific locations along the length of the belt, said standard profile teeth having an addendum equal in length to the dedendum of said pulley teeth; (4) at least one modified profile tooth interspaced with said standard profile teeth, the addendum of said modified tooth being of a chosen reduced size with respect to the addendum of said standard profile teeth, said modified teeth having an aperture extending therethrough from said backing of said belt to a top land of said tooth forming a mounting strut on said belt; and (5) at least one transporting device for storing articles, said transporting device having a mounting base having at least one aperture for attachment to said belt; and
   D. at least one attachment assembly for attaching said transporting device to said modified tooth, said assembly comprising: (1) a tip plate having at least one aperture located in line with the aperture of said modified teeth; (2) a nonstandard bolt for axially routing through the apertures in said tip plate, said modified tooth and said base of said transporting device to bolt said transporting device to said belt, said bolt comprising: (a) a flat-head; (b) a smooth cylindrical top shank having one end depending from said flat-head; (c) a standard-thread lower shank having a diameter smaller than said top shank depending from a central region of another end of said top shoulder shank forming a circular shoulder at the interface, said shoulder providing a load-bearing surface for the base of said transporting device when the transporting device is compressed against the belt; and (3) a standard-thread locknut which threads upon the lower shank of said bolt for locking the transporting device to the backing of said belt;
   wherein when said locknut is tightened the base of the transporting device compresses the backing of said belt a controlled amount against the shoulder of said bolt and wherein the location of said shoulder of said bolt relative to the location of the top surface of the backing of the belt precludes distorting the profile of the belt whereby said modified tooth with said attachment assembly disposed thereon intermeshes with the pulley teeth without any substantial interference.

2. Apparatus in accordance with claim 1 wherein said shoulder of said bolt is located at a chosen depth below a top surface of said backing prior to compressing the backing when tightening said locknut.

3. Apparatus in accordance with claim 2 wherein said tightening the transporting device against the backing of the belt is such as to permit a pitch line of the belt to remain coincident with a pitch circle of said pulleys during motion of the belt about said pulleys.

4. A conveying system of the type useful for moving stored articles along a linear path between at least one drive pulley and at least one driven pulley, each of the pulley bearing teeth of a chosen dedendum, said system comprising:
   at least one endless synchronous and flexible belt, movable between the drive and driven pulleys and including a backing defining a pitch line of said belt, a plurality of standard profile teeth having an addendum equal to the dedendum of the pulley teeth and a plurality of modified profile teeth having an addendum less than the dedendum of the pulley teeth, respectively disposed at selected locations along the length of said belt, said modified teeth having at least one aperture extending from said backing of said belt to a top land forming a tooth-shaped profile load-bearing strut for permitting anchorage of a transporting device to said belt and for receiving and transmitting applied forces from the pulley teeth, said transporting device having a base with one or more apertures for attachment thereof to said belt;
   a chosen number of attachment assemblies, cooperating with said modified teeth for attaching said transporting devices to said backing, each of said modified teeth including a flat tip plate disposed on said top land, defining a truncated tooth tip, said tip plate having at least one aperture aligned with said apertures of said modified tooth and said base, respectively, for receiving a nonstandard bolt axially therethrough;
   said bolt including a substantially flat-head, a smooth upper shank of a chosen diameter and length depending at one end from said bolt head, a threaded lower shank of a diameter less than said upper shank and mating therewith at an interface forming a circular shoulder and a locknut tightened to said threaded shank to lock said plate to said top land and fasten said transporting device to said backing;
   said shoulder of said bolt forming a load bearing surface for the base of said transporting device when said transporting device is compressed against the belt, inhibiting distortion of the belt profile during repeated tightenings of said locknut, each of said modified teeth with one of said attachment assemblies disposed thereon intermeshing with the pulley teeth without any significant force being exerted on said truncated tooth tip other than the force transmitted through said attachment assembly from said transporting device moving a stored article.

5. The system of claim 4 further comprising a plurality of tension members extending the length of said belt in line with a pitch line thereof and spaced in a chosen pattern bypassing said apertures in said modified teeth.

6. Apparatus in accordance with claim 5 wherein said shoulder of said bolt and said aperture of said modified teeth form a space region extending from the backing of said belt to said shoulder, said space region having a depth substantially equivalent to the amount of compression sustained by said backing when said bolt is tightened to fasten the base of the transporting devices against the backing.

7. Apparatus in accordance with claim 6 wherein said head of said bolt is fixedly attached to a bottom surface of said tip plate to permit tightening said locknut.

* * * * *